US011439067B2

(12) United States Patent
Jundale et al.

(10) Patent No.: US 11,439,067 B2
(45) Date of Patent: Sep. 13, 2022

(54) SHIFTING DEVICE FOR TRANSMISSION HAVING SHIFTING DEVICE AND HARVESTING MACHINE

(71) Applicant: DEERE & COMPANY, Moline, IL (US)

(72) Inventors: Prashant M. Jundale, Solapur (IN); Prathamesh Dhoke, Digras (IN); Parag Kolte, Malkapur (IN); Jorge Florez J. Moreno, Madrid (ES)

(73) Assignee: Deere & Company, Moline, IL (US)

( * ) Notice: Subject to any disclaimer, the term of this patent is extended or adjusted under 35 U.S.C. 154(b) by 222 days.

(21) Appl. No.: 17/017,091

(22) Filed: Sep. 10, 2020

(65) Prior Publication Data

US 2021/0137010 A1   May 13, 2021

(30) Foreign Application Priority Data

Sep. 10, 2019   (DE) .......................... 102019213717.2

(51) Int. Cl.
*F16H 9/26* (2006.01)
*A01D 69/06* (2006.01)
(Continued)

(52) U.S. Cl.
CPC .............. *A01D 69/06* (2013.01); *F16H 9/26* (2013.01); *F16H 63/38* (2013.01); *A01F 12/56* (2013.01); *F16H 2055/178* (2013.01)

(58) Field of Classification Search
CPC ...... F16H 9/26; F16H 3/22; F16H 2063/3089; F16H 2063/3093; F16H 2063/3096;
(Continued)

(56) References Cited

U.S. PATENT DOCUMENTS 1,564,667 A   12/1925   Guild
4,133,225 A    1/1979   Love
(Continued)

FOREIGN PATENT DOCUMENTS

DE          333689 C   3/1921
DE        2745564 C2   5/1982
(Continued)

OTHER PUBLICATIONS

European Search Report issued in counterpart European application No. 20194038.4 dated Jan. 27, 2021 (9 pages).

*Primary Examiner* — Erin D Bishop (57) ABSTRACT

A shifting device for a transmission is disclosed. The shifting device comprises a transmission shaft, a shift gear being mounted thereon, wherein the shift gear is configured with a connecting hub which is axially displaceable relative to the transmission shaft, wherein the connecting hub has an internal toothing in engagement with an external toothing of the transmission shaft, so that the shift gear is drive-connected to the transmission shaft in an axially displaceable manner therewith. A latching device is further provided, the shift gear being axially displaceable thereby into a plurality of latching positions. The latching device comprises a spring-pretensioned setting pin displaceably mounted radially to the transmission shaft and in engagement with a setting shaft rotatably mounted in the transmission shaft, such that the setting shaft and the setting pin can be brought out of an unlocked position into a locked position and vice-versa by rotating the setting shaft.

14 Claims, 6 Drawing Sheets

(51) Int. Cl.
*F16H 63/38* (2006.01)
*A01F 12/56* (2006.01)
*F16H 55/17* (2006.01)

(58) Field of Classification Search
CPC .... F16H 63/34; F16H 63/38; F16H 2055/178; A01D 69/06; A01F 12/56
See application file for complete search history.

(56) References Cited

U.S. PATENT DOCUMENTS

| | | | |
|---|---|---|---|
| 4,393,644 A | | 7/1983 | Martenas |
| 4,493,223 A | | 1/1985 | Kishi et al. |
| 4,702,340 A | * | 10/1987 | Hamilton ............... B62M 23/00 |
| | | | 280/270 |
| 5,477,742 A | * | 12/1995 | Burger .................... F16H 61/24 |
| | | | 74/473.26 |
| 6,796,921 B1 | | 9/2004 | Buck et al. |

FOREIGN PATENT DOCUMENTS

| | | |
|---|---|---|
| DE | 3339560 A1 | 5/1984 |
| EP | 0160199 A2 | 11/1985 |
| EP | 1932622 A2 | 6/2008 |
| GB | 2005383 A | 4/1979 |

\* cited by examiner

SHIFTING DEVICE FOR TRANSMISSION HAVING SHIFTING DEVICE AND HARVESTING MACHINE

RELATED APPLICATIONS

This claims priority to German Application No. 102019213717.2, Shifting Device, Transmission having Such A Shifting Device and Harvesting Machine, filed Sep. 10, 2019, which is hereby incorporated by reference in its entirety.

FIELD OF THE DISCLOSURE

The disclosure relates to a shifting device for a transmission, having a transmission shaft, a shift gear being mounted thereon, wherein the shift gear is configured with a connecting hub which is axially displaceable relative to the transmission shaft, wherein the connecting hub has an internal toothing which is in engagement with an external toothing of the transmission shaft, so that the shift gear is drive-connected to the transmission shaft in an axially displaceable manner therewith. The disclosure further relates to a transmission having such a shifting device and a harvesting machine having such a transmission.

BACKGROUND OF THE DISCLOSURE

Shifting devices for transmissions, as well as drive devices having transmissions, for drivable processing devices on harvesting machines are known and are used in various forms in many different areas. Thus, for example, DE 2 745 564 C2 discloses a drive device for a processing device of a combine harvester, having a belt drive and a belt pulley which is arranged on a hollow shaft which is concentric to a main drive shaft. A drive gear is arranged on the hollow shaft and a shifting element is provided, said shifting element being axially displaceable into two positions and selectively connecting the main drive shaft in each case to a gear which has a different rotational direction and which is connected to the drive gear, wherein the shifting element in a first position connects a sun gear of a planetary transmission via planet gears and a second sun gear to the main drive shaft and in a second position connects the sun gear of the planetary transmission via planet gears and a ring gear carrier to the main drive shaft.

DE 2 744 344 C3 also discloses a drive device for harvesting machines having a belt drive, which has an output pulley rotatably mounted on an output shaft. The belt drive is able to be drive-connected directly, or indirectly via an optionally engageable reduction gear, to an output shaft, for example to an output shaft for a threshing drum.

Also known from the prior art are other arrangements of shifting devices for transmissions, in particular also in combination with belt drives, which are used in agricultural machines, in particular harvesting machines with processing devices for collected harvested crops. For example, these include combine harvesters, forage harvesters or sugar cane harvesters or even other harvesting machines which provide processing for collected harvested crops in the machine. Thus when harvesting the harvested crops, threshing, chopping, cutting or a different type of processing may be provided in the harvested crop flow, wherein different drive stages and thus a variation in speed are provided for the processing devices, such as a chopping drum.

Thus, for example, combine harvesters with chopping devices are known, said chopping devices being connected downstream of a threshing device and a screen device and undertaking the chopping of the remaining harvested crops. Such chopping devices comprise chopping drums which, driven by a belt drive, are drivable for example at two different speeds via a corresponding transmission. The different speeds serve for adapting the chopping device to the harvested crops and for requests by the operator relative to the chopping output (chopping length of the harvested crops). At the same time, threshing operations without a chopping operation arranged downstream thereof are also desired by the operator. Chopping devices are generally driven by belt drives, wherein the belt drive leads from a belt pulley connected to the drive motor of the harvesting machine. Thus the chopping device is generally directly associated with the speed of the drive motor, which has the result that even the components of the chopping device such as seals, bearings or the lubricating system are directly influenced by the speed of the drive motor. Since high speeds are occasionally required, such components also have to be correspondingly designed for these high speeds in order to cope with the high temperatures associated therewith and to avoid damage, in particular in the seals, and to reduce the wear thereof. This in turn requires specific seals and lubrication devices, which results in more complex components and thus the higher costs associated therewith. In order to avoid this, it is desirable in the case of high speeds of the drive motor to adapt the drive ratio to the chopping device and/or to reduce the speed of the chopping device such that excessive speeds may be avoided. It is also advisable to provide a device by which a chopping device may be optionally uncoupled from the drive by the drive motor. Known drive devices for chopping devices provide structural alterations for the speed reduction, for example the removal of connecting pins or other coupling means. This is always associated with a certain effort on the part of the operator in terms of installation and or conversion, which has a negative impact on the efficiency and the time management.

SUMMARY OF THE DISCLOSURE

The object of the disclosure is to specify a shifting device of the type mentioned in the introduction by which the aforementioned problems are remedied.

The object is achieved according to the disclosure by the teaching of claim 1, 10 and 14. Further advantageous embodiments and developments of the disclosure are disclosed in the subclaims.

According to the disclosure, an agricultural machine of the type mentioned in the introduction is configured such that a latching device is provided, the shift gear being axially displaceable thereby into a plurality of latching positions. The latching device comprises a spring-pretensioned setting pin which is displaceably mounted radially to the transmission shaft and which is in engagement with a setting shaft which is rotatably mounted in the transmission shaft, by means of which setting shaft the setting pin is able to be brought out of an unlocked position into a locked position and vice-versa by rotating the setting shaft. The latching device permits the shift gear to be able to be axially displaced into a plurality of positions relative to the transmission shaft and subsequently fixed and/or locked. If the axial position of the shift gear is intended to be altered again, the setting pin may be released and/or unlocked again by simple actuation of the setting shaft. The setting pin is locked and/or unlocked by rotating the setting shaft, wherein the setting shaft is preferably rotatable by 180° and the setting pin is moved and displaced by rotating the setting shaft, wherein the setting pin is spring-pretensioned and the setting shaft is in engagement and/or is able to be brought into engagement with the setting pin under spring pretensioning.

The setting pin may be guided in a through-bore which extends radially to the transmission shaft and which extends from the setting shaft to the connecting hub, wherein the through-bore has a first opening relative to the setting shaft and a second opening relative to the connecting hub. Thus the setting pin may be axially movably guided in the through-bore, wherein the ends of the setting pin, depending on the axial position of the setting pin in the through-bore, protrude to a greater or lesser extent out of the opposing openings into the region of the connecting hub and/or the setting shaft.

The connecting hub is provided on the transmission shaft side with a plurality of annular grooves which are axially spaced apart relative to the transmission shaft and which in each case are able to be brought into engagement with the setting pin. The annular grooves which have been formed produce a latching position for the end of the setting pin protruding into the region of the connecting hub, wherein an annular groove is provided for each latching position of the connecting hub, the setting pin being able to protrude therein under spring pretensioning. Preferably, three positions which are axially offset to one another for the connecting hub, and thus three annular grooves which are axially spaced apart from one another, are provided, wherein a larger or smaller number of annular grooves may also be provided.

The setting shaft is rotatable about its longitudinal axis, wherein the setting shaft is mounted at one end so as to be axially displaceable in a guide bore which is coaxially arranged in the transmission shaft and at the other end in a bearing bush inserted in the connecting hub.

The setting shaft has a rotational axis arranged coaxially to the transmission shaft, wherein an eccentric portion which is able to be brought into engagement with the setting pin is arranged on the setting shaft, wherein the eccentric portion is configured by a cylinder which extends axially to the setting shaft with an eccentric center axis which is radially spaced apart from the rotational axis of the setting shaft. The diameter of the cylinder is smaller than the diameter of the setting shaft, such that by rotating the setting shaft the spring-pretensioned setting pin is able to be brought out of a locked position into an unlocked position and vice-versa. Thus for the eccentric portion of the setting shaft the eccentric center axis is arranged offset to the rotational axis of the setting shaft. Since the diameter in this eccentric portion is selected to be smaller than the diameter of the remaining setting shaft, the effect is produced that by rotating the setting shaft about its rotational axis the eccentric portion moves at a specific spacing from the rotational axis of the setting shaft around said setting shaft and, when the setting shaft is rotated, a spacing of the cylinder casing surface of the eccentric portion is altered relative to a wall of the guide bore of the setting shaft and thus also relative to the openings facing the setting shaft. The diameter of the eccentric portion and the offset of the eccentric center axis to the rotational axis are dimensioned such that a minimum spacing between the cylinder casing surface and the wall of the guide bore is virtually zero and a maximum spacing corresponds at least to a depth of the annular grooves configured in the connecting hub, wherein the maximum spacing and the minimum spacing are adjustable by rotating the setting shaft by 180° about the rotational axis.

The cylinder which represents the eccentric portion is provided with a plurality of annular grooves which are axially spaced apart from the transmission shaft and which in each case are able to be brought into engagement with the setting pin and are aligned with the annular grooves configured in the connecting hub. As already described above relative to the annular grooves configured on the connecting hub, in this case the annular grooves configured in the eccentric portion also produce a latching position for the end of the setting pin protruding through the first opening of the through-bore into the region of the setting shaft, wherein in each case an annular groove is provided in the axial direction relative to the transmission shaft for a latching position of the setting shaft, said latching position being adjustable by displacement.

In a first embodiment, the setting pin may comprise a first pin part and a second pin part, wherein a tension spring extends between the first and the second pin part of the setting pin, said tension spring tensioning the first pin part and the second pin part of the setting pin along the through-bore in opposing directions toward the openings of the through-bore. Thus the first pin part of the setting pin extends into the first opening and the second pin part of the setting pin extends into the second opening of the through-bore, such that the setting pin is in engagement at one end with the connecting hub and at the other end with the setting shaft, wherein the aforementioned annular grooves specify the latching positions for the setting pin.

In an alternative embodiment, the setting pin is configured in one piece. To this end, in each case a shoulder is provided on the setting pin and in the through-bore so that at its end facing the connecting hub the setting pin has a larger diameter than at its end facing the setting shaft. Accordingly, the opening of the through-bore facing the connecting hub is provided with a larger diameter than the opening facing the setting shaft. A tension spring, which pretensions the setting pin in the direction of the connecting hub, extends between the shoulders, wherein the setting pin extends at one end into the first opening and at the other end into the second opening, so that the setting pin is able to be brought into engagement at one end with the connecting hub and at the other end with the setting shaft, wherein the aforementioned annular grooves also specify the latching positions for the setting pin in this case. Due to the variable diameters at the ends of the setting pin, the annular grooves on the connecting hub are configured to be wider than the annular grooves configured on the eccentric region of the setting shaft.

The setting pin is provided with spherically rounded ends. Moreover, the annular grooves which are configured on the connecting hub are configured in an annular groove shape corresponding to the spherically rounded ends of the setting pin. Moreover, control edges, which are characterized by a flatter path relative to the curvature of the spherically configured ends of the setting pin, are configured on the flanks of the respective annular grooves. In the individual latching positions the setting pin is in engagement with the respective annular groove, wherein a blocking is provided for the connecting hub. In order to overcome this blocking, the setting pin has to be moved out of the annular groove by axial displacement of the connecting hub. This axial displacement of the connecting hub is facilitated by the control edges, which run flatter, and the flanks of the respective annular grooves, whereby a setting force is applied in the axial direction of the setting pin and whereby the setting pin is moved out of its latching position out of the annular groove.

The described shifting device may be used in many different types of transmissions, wherein the shifting device is actuated for shifting the transmission from a direct drive connection into a drive connection with a transmission step. The transmission provides at least one drive element, for example a belt pulley, which is connected via the shifting device to the transmission shaft which provides the output, wherein the shift gear is brought into engagement, for example, in a first latching position or latched position with the transmission step, so that the drive is implemented on the transmission shaft via the transmission step. In a further latching position and/or latched position, for example, the shift gear may thus be directly in engagement with the drive element.

Further shifting positions and/or shifting stages or latching positions are conceivable. Thus, for example, a neutral position in which the shift gear in a further latching position and/or latched position runs freely and/or idles, and in which no drive connection is present, may also be provided. Additionally, further drive connections may also be provided in further latching positions and/or latched positions with further transmission steps.

The transmission steps may be configured, for example, as a planetary transmission which is already connected to the drive element. The planetary transmission may have a planet carrier which is arranged on the drive element. A sun gear in engagement with the planets may be rotatably mounted between the transmission shaft and the drive element and fixed relative to the drive element and the transmission shaft, for example on a housing of the transmission. If in this constellation the shift gear is now moved out of a direct drive connection between the drive element and the transmission shaft and brought into a connection with the planets, then the drive connection to the transmission shaft is implemented via the planet gears.

The drive element may be configured, for example, as a belt pulley, wherein the transmission shaft is able to be connected to a processing device. For example, a chopping drum may be provided as the processing device, but other processing devices provided in a harvesting machine, such as harvested crop collecting devices, threshing devices, spreader units and the like, may also be driven via an above-described transmission and/or via a transmission with an above-described shifting device.

Thus harvesting machines may comprise processing devices which are driven by the above-described transmission. A drive element configured as a belt pulley may be driven, for example, by a belt drive, wherein the transmission shaft is connected as an output element to the processing device. In this case, the belt drive may be directly connected to the engine of the harvesting machine.

The disclosure and further advantages and advantageous developments and embodiments of the disclosure are described and explained in more detail hereinafter with reference to the drawing, which shows an exemplary embodiment of the disclosure.

BRIEF DESCRIPTION OF THE DRAWINGS

The detailed description of the drawings refers to the accompanying figures in which.

DETAILED DESCRIPTION OF THE DRAWINGS

Figure 1:
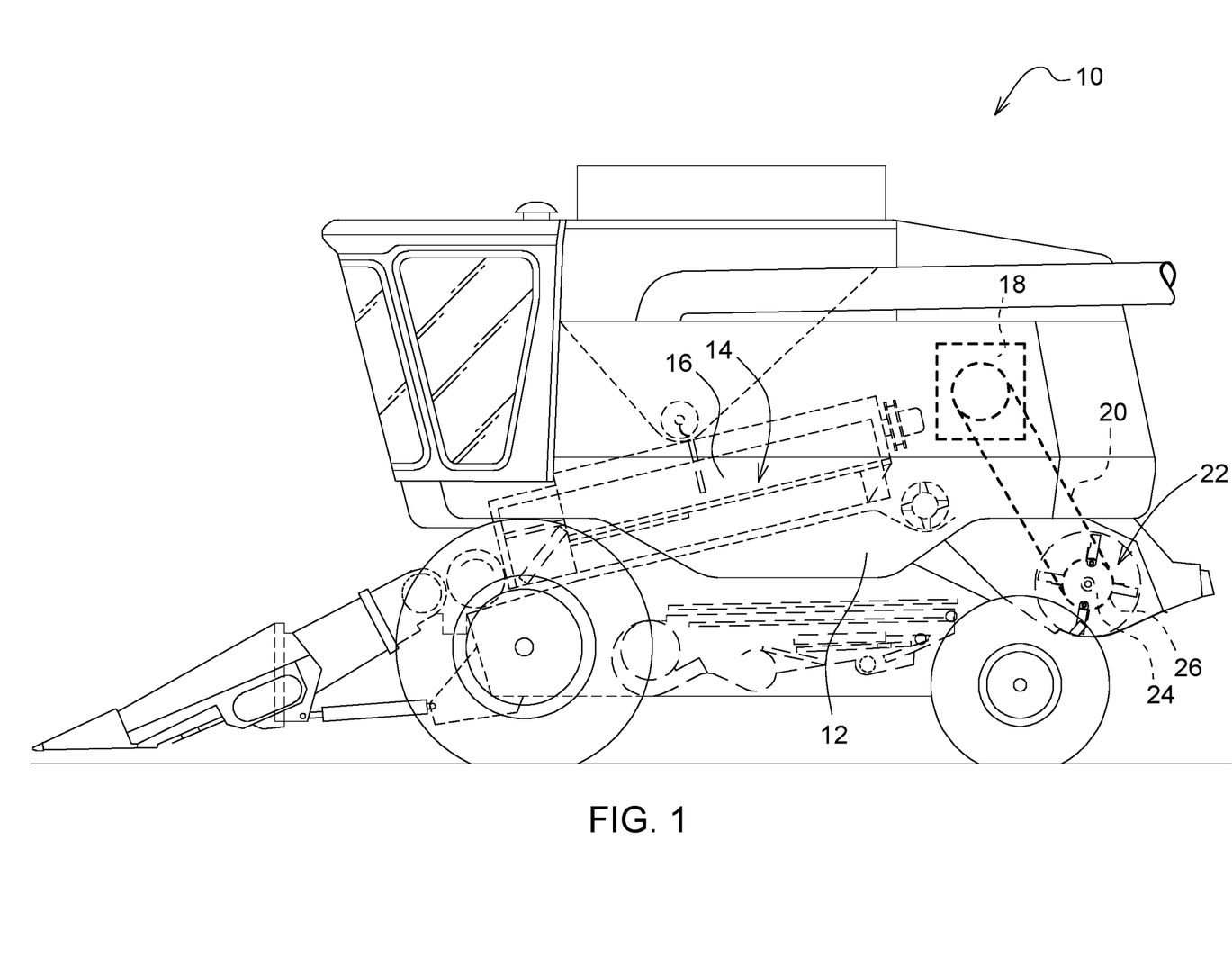
FIG. 1 shows a schematic side view of a harvesting machine in the form of a combine harvester with a processing device and a drive configured therefor in the form of a belt drive.

FIG. 1 shows a self-propelled agricultural machine 10 which is configured by way of example in the form of a combine harvester. It is also perfectly conceivable that the exemplary embodiment described further hereinafter may also be configured on a different type of self-propelled agricultural machine, for example a forage harvester, a combine harvester, a sugar cane harvester or a baler.

The agricultural machine 10 has a machine housing 12 and a first processing device 14 in the form of a threshing device 16 with an axial rotor oriented in the longitudinal direction of the agricultural machine 10. The agricultural machine 10 is driven by an internal combustion engine 18 (only shown schematically). The internal combustion engine 18 is connected on the output side to a drive belt 20, a further processing device, in this case a chopping device 22 with a chopping drum 24, being driven thereby. To this end, the drive belt 20 is connected to a belt pulley 26 which serves as a drive element for a transmission 28 of the chopping device 22.

Figure 2:
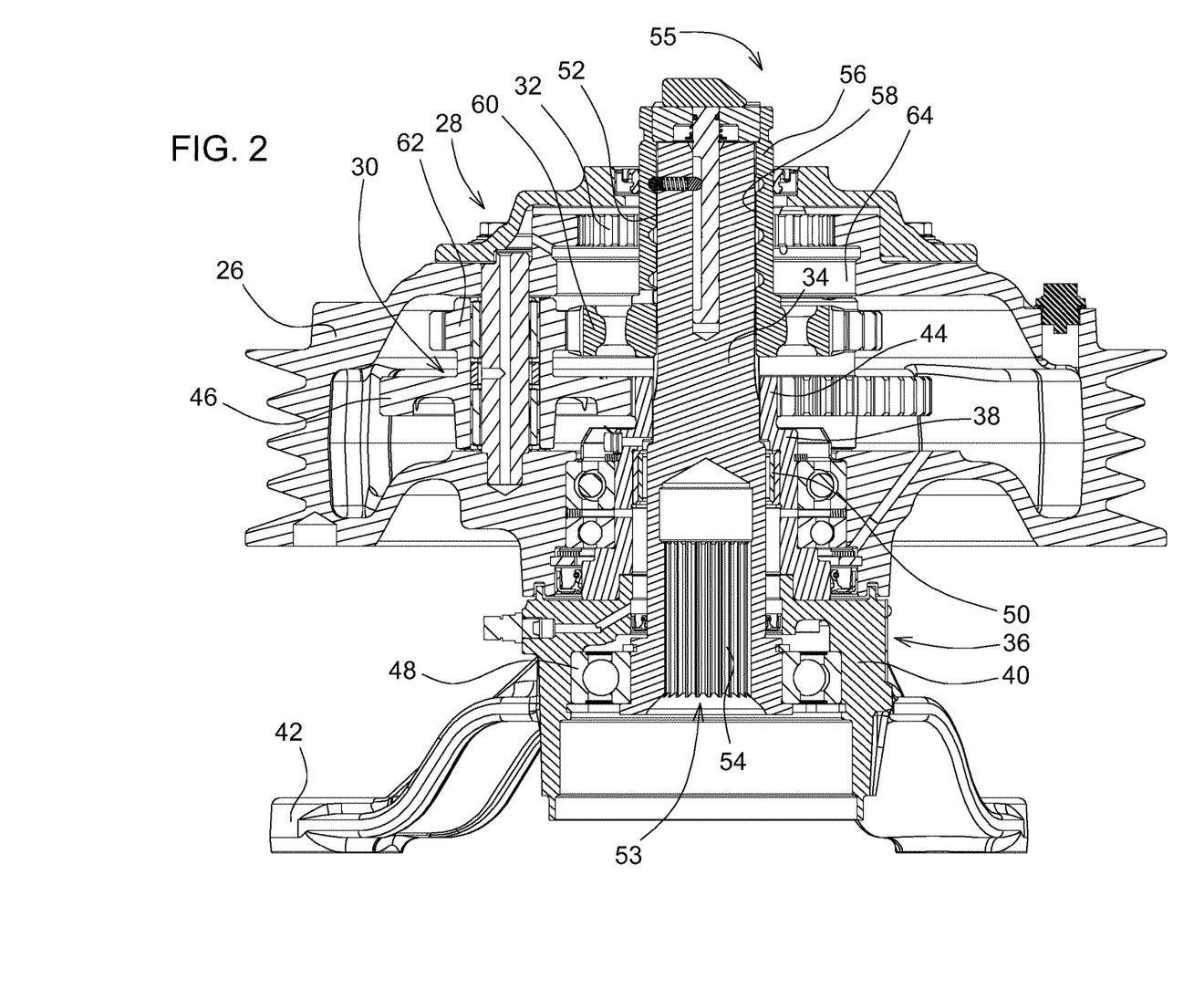
FIG. 2 shows a schematic cross-sectional view of a transmission for the drive of the processing device of FIG. 1 with a belt pulley as the drive element and a shifting device.

The transmission 28 is shown in detail in FIG. 2 and comprises, in addition to the belt pulley 26, a double planetary gear set 30 mounted in the belt pulley 26, wherein the belt pulley 26 serves as a planet carrier, an internal toothing 32 configured in the belt pulley 26, as well as a transmission shaft 34 which serves as an output shaft and which is able to be connected thereto for driving the chopping drum 24. The transmission 28 further comprises a fastening hub 36 which is configured as a hollow profile and which comprises, relative to the belt pulley 26, an internally located fastening hub part 38 and an externally located fastening hub part 40 connected fixedly in terms of rotation thereto. The externally located fastening hub part 40 is connected fixedly in terms of rotation to a fastening flange 42 which is configured on the machine housing 12. A sun gear 44, which is in engagement with a first planetary gear set 46 of the double planetary gear set 30, is configured on the internally located fastening hub part 38. The fastening hub 36 also serves for mounting the belt pulley 26 and the transmission shaft 34, wherein the belt pulley 26 is mounted on the internally located fastening hub part 38 so as to be axially fixed and rotatable on the outer peripheral side of the fastening hub 36. The transmission shaft 34 is mounted so as to be axially fixed and rotatable on the internal peripheral side of the fastening hub 36, wherein a first bearing point 48 is configured on the externally located fastening hub part 40 and a second bearing point 50 is configured on the internally located fastening hub part 38.

The transmission shaft 34 has an external toothing 52 at an end extending inside the belt pulley 26, and an internal toothing 54 configured in a hollow space 53 at an end extending inside the fastening hub 36. The internal toothing 54 configured in the hollow space 53 serves for connecting the transmission shaft 34 to the chopping device 22 and/or chopping drum 24. Moreover, the transmission 28 is provided with a shifting device 55. To this end, an axially displaceable connecting hub 56 is arranged on the external toothing 52, wherein the connecting hub 56 has an internal toothing 58 which engages in the external toothing 52 of the transmission shaft 34. The shifting device 55 further comprises a shift gear 60 which is arranged on the connecting hub 56 and connected fixedly in terms of rotation thereto, so that the shift gear 60 is drive-connected to the transmission shaft 34 in an axially displaceable manner via the connecting hub 56 on the transmission shaft 34.

The shift gear 60 is dimensioned such that by axial displacement of the connecting hub 56 on the transmission shaft 34 it is able to be brought into engagement firstly with a second planetary gear set 62 of the double planetary gear set 30 and secondly with the internal toothing 32 configured in the belt pulley 26. Moreover, inside the belt pulley 26 in the axial direction a free space 64 is configured between the second planetary gear set 62 and the internal toothing 32, the shift gear 60 being axially displaceable therein without engagement.

The shifting device 55 is also provided with a latching device 66 (FIG. 3), the connecting hub 56 and thus the shift gear 60 being axially displaceable thereby into a plurality of latching positions R1, R2, R3. The latching device 66 comprises a spring-pretensioned setting pin 68 which is displaceably mounted radially to the transmission shaft 34 and which, coaxially to the transmission shaft 34, is in engagement with a setting shaft 70, which is rotatably mounted in the transmission shaft 34. The setting pin 68 is guided in a through-bore 72 which extends radially to the transmission shaft 34 and which extends from the setting shaft 70 to the connecting hub 56, wherein the through-bore 72 has a first opening 74 relative to the setting shaft 70 and a second opening 76 relative to the connecting hub 56. Thus the setting pin 68 may be guided in the through-bore 72, in an axially movable manner relative to the through-bore 72, wherein the ends of the setting pin 68, depending on the axial position of the setting pin 68 in the through-bore 72, protrude to a greater or lesser extent from the opposing openings 74, 76 into the region of the connecting hub 56 and/or the setting shaft 70.

Figure 3:
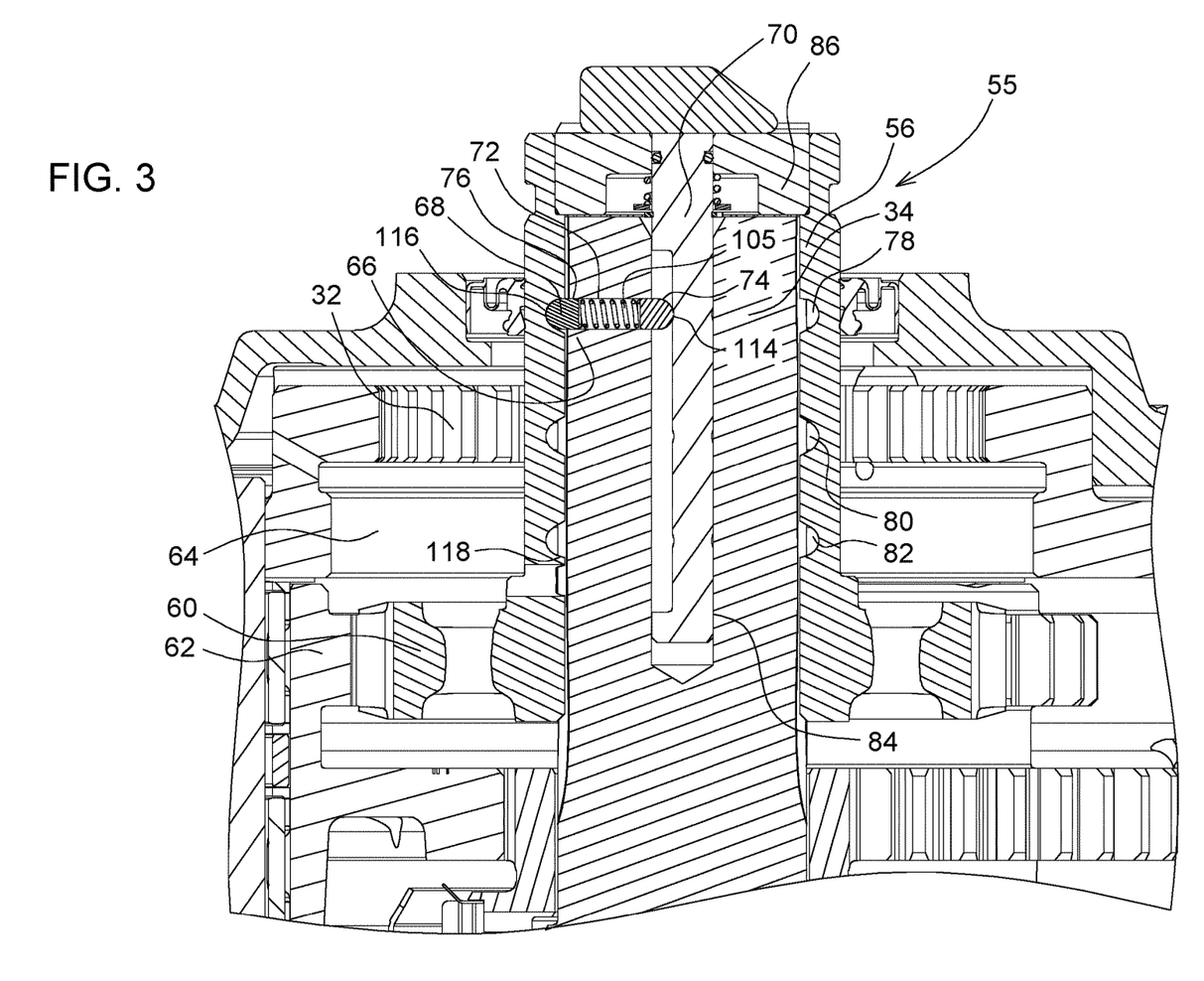
FIG. 3 shows an enlarged schematic cross-sectional view of the shifting device of FIG. 2.

The connecting hub 56 is provided on the transmission shaft side with a plurality of annular grooves 78, 80, 82 which are axially spaced apart from the transmission shaft 34 and which in each case are able to be brought into engagement with the setting pin 68. The annular grooves 78, 80, 82, which are thus formed, in each case produce a latching position R1, R2, R3 for the end of the setting pin 68 protruding into the region of the connecting hub 56, wherein an annular groove 78, 80, 82 is provided for each adjustable latching position R1, R2, R3, the spring-pretensioned setting pin 68 being able to protrude therein. In the exemplary embodiment shown, three latching positions R1, R2, R3 which are axially offset to one another for the connecting hub 56, and thus three annular grooves 78, 80, 82 which are axially spaced apart from one another, are provided.

The setting shaft 70 is rotatable about its longitudinal axis, wherein the setting shaft 70 at one end is axially displaceably mounted in a guide bore 84 coaxially arranged in the transmission shaft 34, and at the other end rotatably mounted in a bearing bush 86 inserted into the connecting hub 56. Thus it is ensured, on the one hand, that the setting shaft 70 is axially displaceably mounted relative to the transmission shaft 34 and, on the other hand, the setting shaft 70 and the connecting hub 56 are always axially displaced together relative to the transmission shaft 34.

Figure 4:
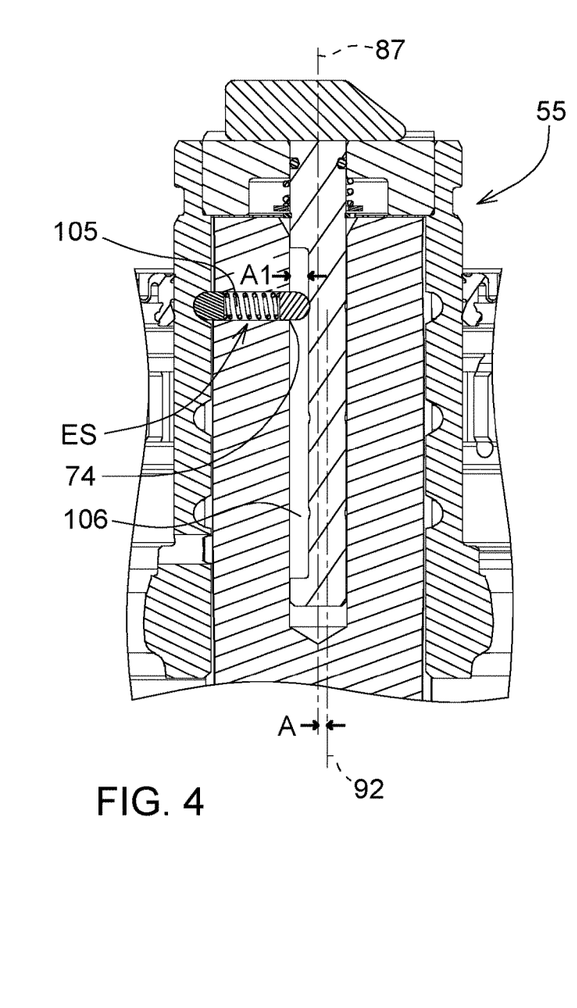
FIG. 4 shows a further enlarged schematic cross-sectional view of the shifting device of FIG. 2 or 3 with a setting shaft in the unlocked position.
Figures 5, 6:
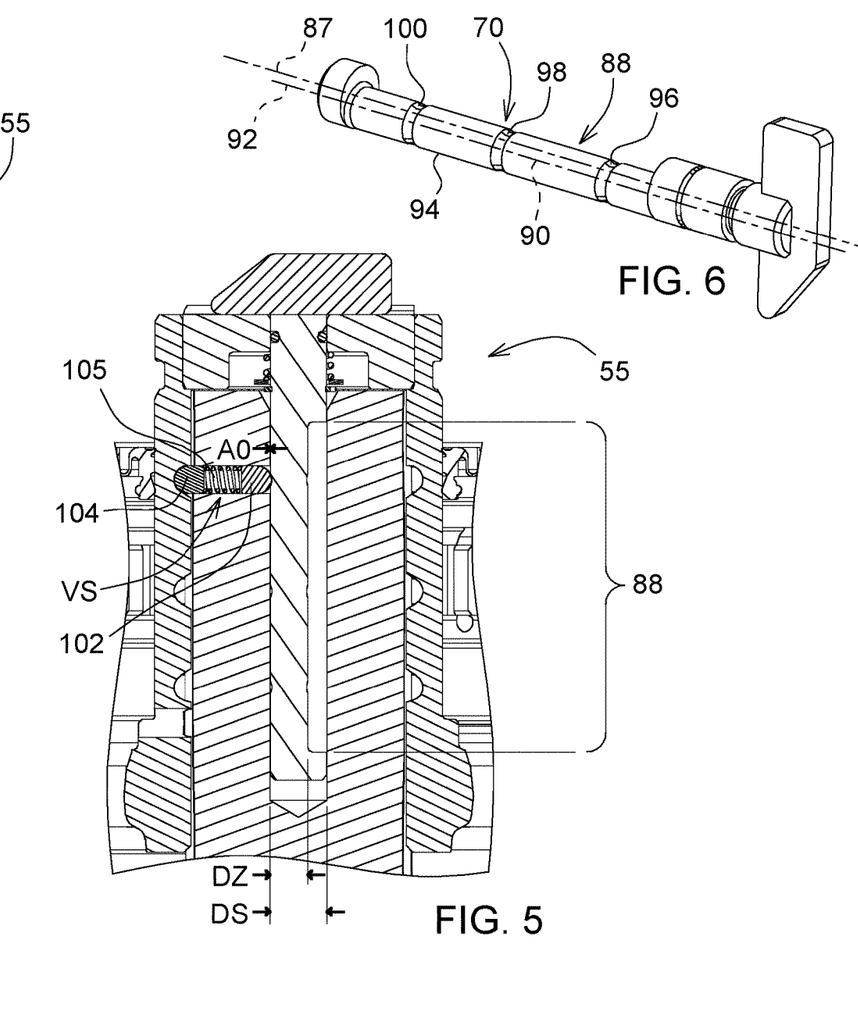
FIG. 5 shows a further enlarged schematic cross-sectional view of the shifting device of FIG. 2 or 3 with a setting shaft in the locked position.
FIG. 6 shows a perspective schematic view of the setting shaft of FIGS. 2 to 5.

As may be identified in detail in FIGS. 4 to 6, the setting shaft 70 has a rotational axis 87 arranged coaxially to the transmission shaft 34, wherein an eccentric portion 88 is arranged on the setting shaft 70, said eccentric portion being able to be brought into engagement with the setting pin 68, wherein the eccentric portion 88 is configured by a cylinder 90 extending axially to the setting shaft 70 with an eccentric center axis 92, which is radially spaced apart from the rotational axis 87 of the setting shaft 70 (spacing A). The diameter DZ of the cylinder 90 is smaller than the diameter DS of the setting shaft 70 such that by rotating the setting shaft 70 by 180° the spring-pretensioned setting pin 68 is able to be brought from a locked position VS into an unlocked position ES and vice-versa (FIG. 4 shows the setting shaft 70 and/or the setting pin 68 in the unlocked position ES and FIG. 5 in the locked position VS). Thus for the eccentric portion 88 of the setting shaft 70 the eccentric center axis 92 is arranged offset to the rotational axis 87 of the setting shaft 70. Since the diameter DZ in this eccentric portion 88 is selected to be smaller than the diameter DS of the remaining setting shaft 70, this has the effect that, by rotating the setting shaft 70 about its rotational axis 87, the eccentric portion 88 moves at a certain spacing from the rotational axis 87 of the setting shaft 70 around said setting shaft, and a spacing A1, A0 between the wall of the guide bore 84 and/or between the first opening 74 and a cylinder casing surface 94 of the eccentric portion 88 facing the wall and/or the first opening is altered, when the setting shaft 70 is rotated (see FIG. 4 and FIG. 5 in comparison). The diameter DZ of the eccentric portion 88 and the offset of the eccentric center axis 92 to the rotational axis 87 are dimensioned such that a minimum spacing A0 between the cylinder casing surface 94 and the wall of the guide bore 84 and/or between the first opening 74 and the cylinder casing surface 94 is virtually zero and a maximum spacing A1 corresponds at least to the depth of the annular grooves 78, 80, 82 configured in the connecting hub 56, wherein the maximum spacing A1 and the minimum spacing A0 are adjustable by rotating the setting shaft 70 by 180° around the rotational axis 87.

The cylinder 90, which forms the eccentric portion 88, is provided with a plurality of annular grooves 96, 98, 100 which are axially spaced apart from the transmission shaft 34 and which in each case are able to be brought into engagement with the setting pin 68 and are aligned with the annular grooves 78, 80, 82 configured in the connecting hub 56. As already described with reference to the annular grooves 78, 80, 82 configured on the connecting hub 56, in this case the annular grooves 96, 98, 100 configured in the eccentric portion also produce a latching position for the end of the setting pin 68 protruding through the first opening 74 of the through-bore 72 into the region of the setting shaft 70, wherein in each case an annular groove is provided in the axial direction toward the transmission shaft 34 for a latching position of the setting shaft 70, said latching position being adjustable by displacement.

In a first embodiment (according to FIGS. 2 to 5 and 7A to 7C) the setting pin 68 is configured with a first pin part 102 and a second pin part 104, wherein a tension spring 105 extends between the first and the second pin part 102, 104 of the setting pin 68, said tension spring stretching apart the first pin part 102 and the second pin part 104 of the setting pin 68 along the through-bore 72 in opposing directions to the openings 74, 76 of the through-bore 72. Thus the first pin part 102 of the setting pin 68 extends into the first opening 74 and the second pin part 104 of the setting pin 68 extends into the second opening 76 of the through-bore 72. The setting pin 68 is thus in engagement at one end with the connecting hub 56 and at the other end with the setting shaft 70, wherein the aforementioned annular grooves 78, 80, 82 and 96, 98, 100 predetermine the latching positions for the setting pin 68. In the rotated position of the setting shaft 70, shown in FIG. 4, the maximum spacing A1 is adjusted and a free space 106 is configured between the first opening 74 and the eccentric portion 88, the setting pin 68 with its first pin part 102 being able to extend therein. In this rotated position of the setting shaft 70, the setting pin 68 adopts its unlocked position ES, where the spring is "relaxed", in which the connecting hub 56 may be axially displaced by the second pin part 104 moving out of the annular grooves 78, 80, 82 and the tension spring 105 being able to be compressed. In the rotated position of the setting shaft 70, shown in FIG. 5, the minimum spacing A0 is now adjusted, wherein the free space 106 has been displaced by rotating the setting shaft 70. The eccentric portion 88 in this rotated position compresses the setting pin 68 and pushes said setting pin into the annular groove 78. In this rotated position of the setting shaft 70, the setting pin 68 adopts its locked position VS, in which the tension spring 105 is fully compressed so that the first pin part 102 is located in the through-bore 72 and the second pin part 104 is located fixedly in the annular groove and effectively blocks an axial displacement of the connecting hub 56.

Figure 8:
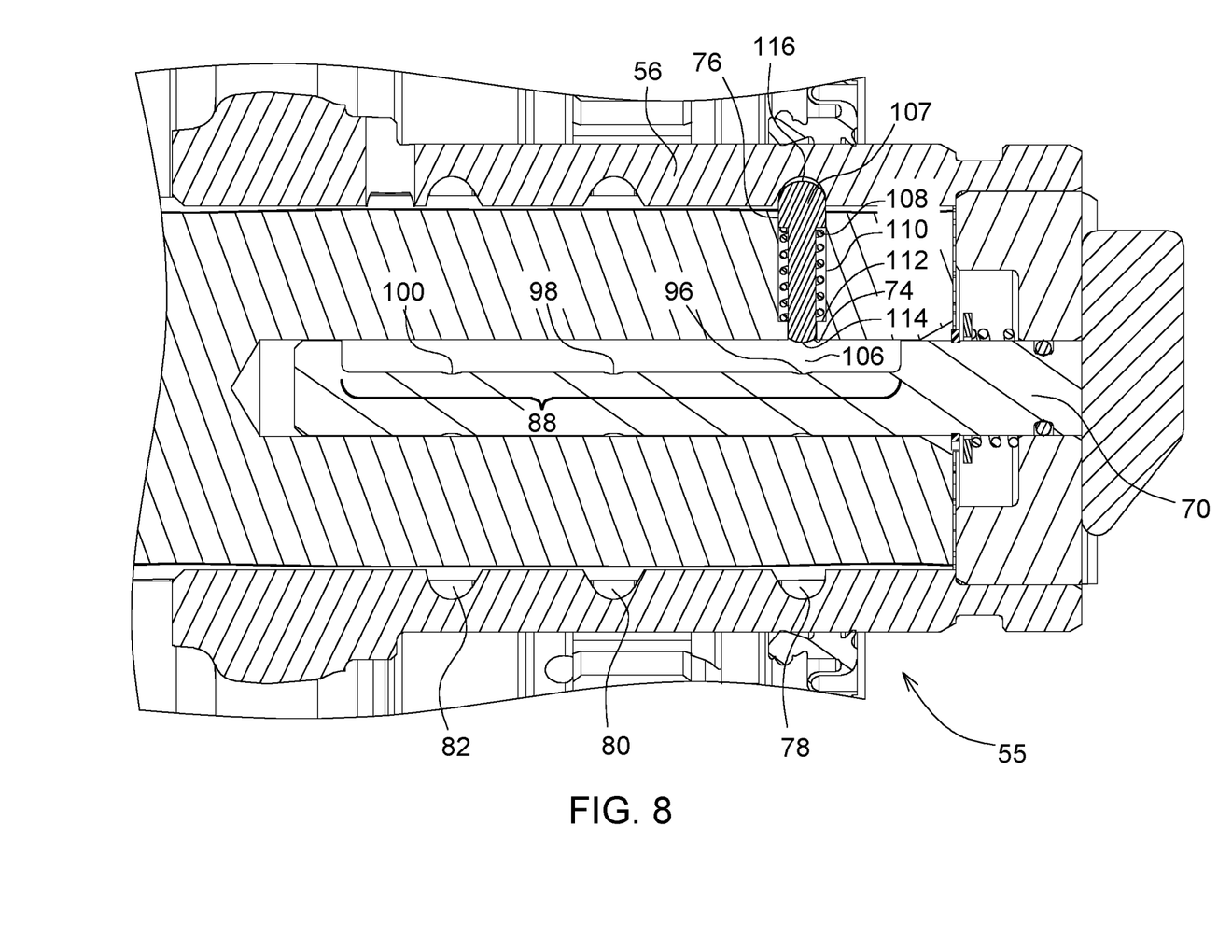
FIG. 8 shows an enlarged schematic cross-sectional view of the shifting device of FIGS. 2 to 7C with an alternative embodiment for a setting pin.

In an alternative embodiment according to FIG. 8, a setting pin 107 is configured in one piece. Moreover, a shoulder 108 is provided on the setting pin 107, so that the setting pin 107 has a larger diameter at an end facing the connecting hub 56 than at an end facing the setting shaft 70. To this end, relative to the above-described embodiment, a modified through-bore 110 is provided in which here the through-bore 110 at its end facing the setting shaft 70 is also configured with a shoulder 112, such that the second opening 76 of the through-bore 110 facing the connecting hub 56 is provided with a larger diameter than the first opening 74 facing the setting shaft 70. The tension spring 105 which pretensions the setting pin 107 in the direction of the connecting hub 56 extends between the shoulders 108 and 112, wherein the setting pin 107 extends at one end into the first opening 74 and at the other end into the second opening 76, so that the setting pin 107 is able to be brought into engagement at one end with the connecting hub 56 and at the other end with the setting shaft 70. Moreover, according to the alternative embodiment the shifting device 55 with the setting pin 107 is identical to the above-described shifting device 55 with the setting pin 68. Also in this case the annular grooves 78, 80, 82 and 86, 98, 100 predetermine the latching positions for the setting pin 107. Due to the variable diameters at the ends of the setting pin 107, the annular grooves 78, 80, 82 on the connecting hub 56 are configured to be broader than the annular grooves 96, 98, 100 configured on the eccentric region 88 of the setting shaft 70. In the rotated position of the setting shaft 70, shown in FIG. 8, an unlocked position ES for the setting pin 107 is provided since this setting pin may be moved into the free space 106 by axial displacement of the connecting hub 56. By rotating the setting shaft 70 by 180°, the setting pin 107 would be blocked and moved into the locked position VS, wherein the eccentric portion 88 in this rotated position pushes the setting pin 107 into the annular groove 78 and holds and/or blocks said pin therein. In this rotated position of the setting shaft 70, the setting pin 107 adopts its locked position VS in which an axial displacement of the connecting hub 56 is effectively blocked.

In both exemplary embodiments, the setting pin 68, 107 is provided with spherically rounded ends 114, 116. Moreover, the annular grooves 78, 80, 82 configured on the connecting hub 56 and the annular grooves 96, 98, 100 configured in the setting shaft 70 are configured with an annular groove shape which corresponds to the spherically rounded ends of the setting pin 68, 107. Moreover, control edges 118 are configured on the flanks of the respective annular grooves of the connecting hub 56, said control edges being characterized by a flatter path relative to the curvature of the ends of the setting pin 68, 107 which are configured in a spherical manner facing the connecting hub 56. In the individual latching positions, the setting pin 68, 107 is in engagement with the respective annular groove 78, 80, 82 of the connecting hub 56, whereby a blocking is provided for the connecting hub 56. In order to overcome this blocking, the setting pin 68, 107 now has to be moved out of the annular groove 78, 80, 82 by axial displacement of the connecting hub 56. By means of the control edges 118, which run flatter on the flanks of the respective annular grooves 78, 80, 82, this axial displacement of the connecting hub 56 is facilitated and a setting force is applied in the axial direction of the setting pin 68, 107, whereby the setting pin 68, 107 is moved out of the annular groove 78, 80, 82.

Figure 7A:
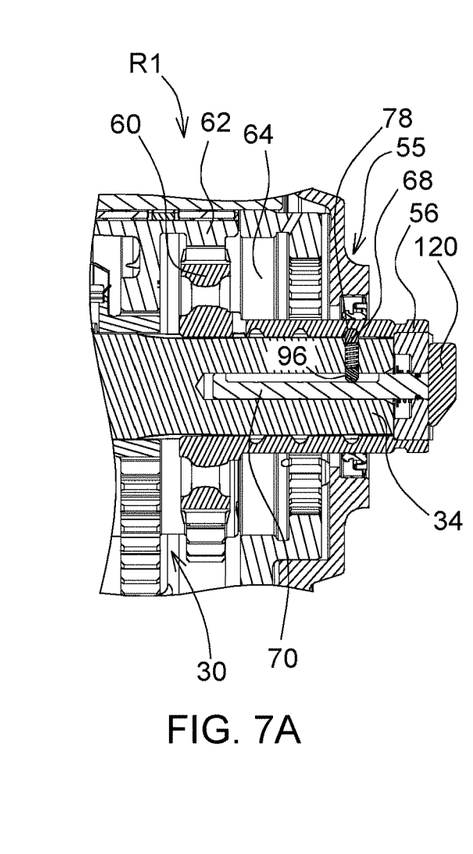
FIG. 7A shows a perspective schematic view of the shifting device of FIGS. 2 to 5 with a shift gear in a first shifting position in a direct drive connection with the belt pulley.
Figure 7B:
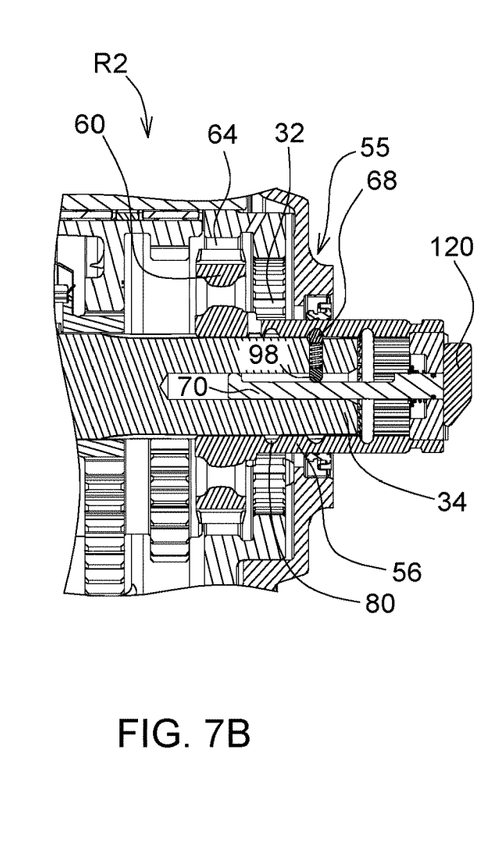
FIG. 7B shows a perspective schematic view of the shifting device of FIGS. 2 to 5 with the shift gear in a second shifting position without the drive connection (neutral position)
Figure 7C:
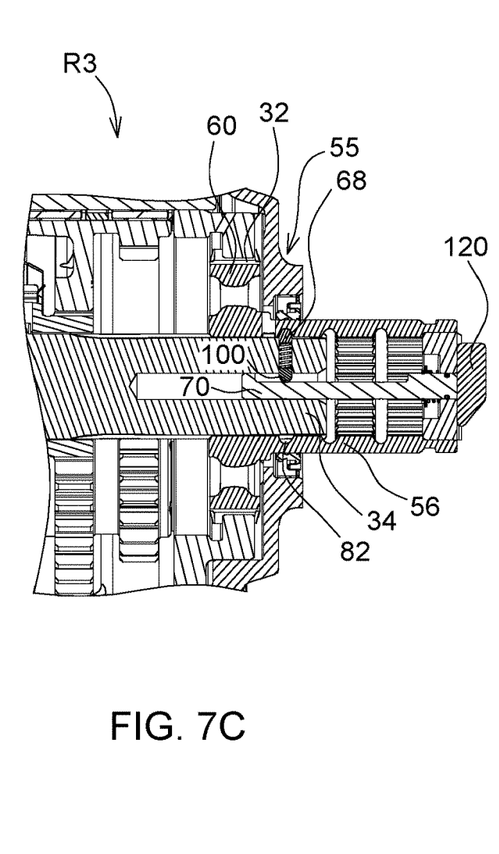
FIG. 7C shows a perspective schematic view of the shifting device of FIGS. 2 to 5 with the shift gear in a third shifting position in a drive connection with the planetary transmission.

As is now shown in FIGS. 7A, 7B and 7C, the shift gear 60 may be moved into three different latching positions R1, R2 R3. In the latching positions shown in FIGS. 7A, 7B and 7C, the setting pin 68 is already located in the unlocked position ES. By actuating a grip configured at the free end of the setting shaft 70, the setting shaft 70 may be rotated and the setting pin 68 moved into the locked position VS according to FIG. 5. By further rotation of the setting shaft 70 by 180°, the setting pin may be moved again into the unlocked position ES according to FIGS. 2 to 4 and 7A, 7B, 7C and FIG. 8.

In the first latching position R1, which is shown in FIG. 7A, the connecting hub 56 is moved into a retracted position relative to the transmission shaft 34. The setting pin 68 is in engagement with the annular grooves 78 and 96. The shift gear 60 is drive-connected to the second planetary gear set 62 of the double planetary gear set 30. In this shifting position and/or latching position R1 a drive ratio is achieved from the belt pulley 26 via the double planetary gear set 30.

In the second latching position R2, which is shown in FIG. 7B, the connecting hub 56 is moved into a central position relative to the transmission shaft 34. The setting pin 68 is in engagement with the annular grooves 80 and 98. The shift gear 60 is not drive-connected and rotates freely in the free space 64 configured between the second planetary gear set 62 and the internal toothing 32. In this shifting position and/or latching position R2, there is no drive connection between the belt pulley 26 and the transmission shaft 34.

In the third latching position R3, which is shown in FIG. 7C, the connecting hub 56 is moved into an extended position relative to the transmission shaft 34. The setting pin 68 is in engagement with the annular grooves 82 and 100. The shift gear 60 is drive-connected to the internal toothing 32. In this shifting position and/or latching position R3, a direct drive ratio is achieved from the belt pulley 26 to the transmission shaft 34.

The above-described latching positions R1, R2, R3, shown in FIGS. 7A, 7B and 7C, are used in the same manner in an embodiment with a setting pin 107 according to FIG. 8.

What is claimed is:

1. A shifting device for a transmission, having a transmission shaft, a shift gear being mounted thereon, wherein the shift gear is configured with a connecting hub which is axially displaceable relative to the transmission shaft, wherein the connecting hub has an internal toothing which is in engagement with an external toothing of the transmission shaft, so that the shift gear is drive-connected to the transmission shaft in an axially displaceable manner therewith, wherein a latching device is provided, the shift gear being axially displaceable thereby into a plurality of latching positions, and the latching device comprises a spring-pretensioned setting pin which is displaceably mounted radially to the transmission shaft and which is in engagement with a setting shaft which is rotatably mounted in the transmission shaft, by means of which setting shaft the setting pin is able to be brought out of an unlocked position into a locked position and vice-versa by rotating the setting shaft.

2. The shifting device as claimed in claim 1, wherein the setting pin is guided in a through-bore which extends radially to the transmission shaft and which extends from the setting shaft to the connecting hub, wherein the through-bore has a first opening relative to the setting shaft and a second opening relative to the connecting hub.

3. The shifting device as claimed in claim 2, wherein the setting pin comprises a first pin part and a second pin part and a tension spring extends between the first and the second pin part of the setting pin, said tension spring tensioning the first pin part and the second pin part of the setting pin along the through-bore in opposing directions, wherein the first pin part of the setting pin extends into the first opening and the second pin part of the setting pin extends into the second opening, such that the setting pin is in engagement at one end with the connecting hub and at the other end with the setting shaft.

4. The shifting device as claimed in claim 2, wherein the setting pin is configured in one piece and the setting pin and the through-bore in each case are provided with a shoulder, wherein a tension spring, which pretensions the setting pin in the direction of the connecting hub, extends between the shoulders, wherein the setting pin extends at one end into the first opening and at the other end into the second opening, so that the setting pin is able to be brought into engagement at one end with the connecting hub and at the other end with the setting shaft.

5. The shifting device as claimed in claim 1, wherein the connecting hub is provided on the transmission shaft side with a plurality of annular grooves which are axially spaced apart from the transmission shaft and which in each case are able to be brought into engagement with the setting pin.

6. The shifting device as claimed in claim 5, wherein the setting pin comprises spherically rounded ends and the annular grooves which are configured on the connecting hub are configured with an annular groove shape which corresponds to the spherically rounded ends of the setting pin, wherein control edges, which are characterized by a flatter path relative to the curvature of the spherically configured ends of the setting pin, are configured on the flanks of the respective annular grooves.

7. The shifting device as claimed in claim 1, wherein the setting shaft is rotatable about its longitudinal axis, wherein the setting shaft is mounted at one end so as to be axially displaceable in a guide bore which is coaxially arranged in the transmission shaft and at the other end so as to be axially fixed in a bearing bush connected to the connecting hub.

8. The shifting device as claimed in claim 1, wherein the setting shaft has a rotational axis arranged coaxially to the transmission shaft, wherein an eccentric portion which is able to be brought into engagement with the setting pin is arranged on the setting shaft, wherein the eccentric portion is configured by a cylinder extending axially to the setting shaft, the cylinder center axis thereof being radially spaced apart from the rotational axis of the setting shaft, and the diameter thereof being smaller than the diameter of the setting shaft such that by rotating the setting shaft the spring-pretensioned setting pin is able to be brought out of a locked position into an unlocked position and vice-versa.

9. The shifting device as claimed in claim 8, wherein the cylinder is provided with a plurality of annular grooves which are axially spaced apart from the transmission shaft and which in each case are able to be brought into engagement with the setting pin and are aligned with the annular grooves configured in the connecting hub.

10. A transmission comprising a drive element and a transmission step, characterized by a shifting device as claimed in claim 1, wherein the shift gear is able to be brought into a first latching position, in which the shift gear is in engagement with the transmission step, and into a further latching position in which the shift gear is directly in engagement with the drive element.

11. The transmission as claimed in claim 10, wherein the shift gear is able to be brought into a further latching position in which the shift gear is moved into a neutral position.

12. The transmission as claimed in claim 10, wherein the transmission step is configured by a planetary transmission which is connected to the drive element, wherein a planet carrier of the planetary transmission is arranged on the drive element and a sun gear in engagement with the planets is rotatably mounted on the transmission shaft and on the drive element and is fixed relative to the drive element and the transmission shaft.

13. The transmission as claimed in claim 10, wherein the drive element is configured as a belt pulley and the transmission shaft is able to be connected to a processing device.

14. A harvesting machine comprising at least one processing device and a transmission as claimed in claim 13, wherein the belt pulley is driven by a belt drive and the transmission shaft is connected to the processing device.

* * * * *